(12) United States Patent
Muto et al.

(10) Patent No.: US 11,428,344 B2
(45) Date of Patent: Aug. 30, 2022

(54) VALVE

(71) Applicant: KITZ CORPORATION, Chiba (JP)

(72) Inventors: Taisuke Muto, Chino (JP); Tetsuya Kobayashi, Chino (JP)

(73) Assignee: KITZ CORPORATION, Chiba (JP)

(*) Notice: Subject to any disclaimer, the term of this patent is extended or adjusted under 35 U.S.C. 154(b) by 0 days.

(21) Appl. No.: 16/758,609

(22) PCT Filed: Nov. 7, 2018

(86) PCT No.: PCT/JP2018/041309
§ 371 (c)(1),
(2) Date: Apr. 23, 2020

(87) PCT Pub. No.: WO2019/093363
PCT Pub. Date: May 16, 2019

(65) Prior Publication Data
US 2021/0180721 A1    Jun. 17, 2021

(30) Foreign Application Priority Data

Nov. 7, 2017    (JP) .............................. JP2017-214492

(51) Int. Cl.
*F16K 43/00* (2006.01)
*F16K 27/10* (2006.01)
(Continued)

(52) U.S. Cl.
CPC .......... *F16K 43/008* (2013.01); *F16K 27/102* (2013.01); *F16K 27/12* (2013.01); *F16K 41/08* (2013.01)

(58) Field of Classification Search
CPC ........ F16K 27/12; F16K 41/08; F16K 43/008; F16K 27/10; F16K 27/102
(Continued)

(56) References Cited

U.S. PATENT DOCUMENTS

| 1,483,631 A | * | 2/1924 | Forbes | .................... F16K 41/02 |
| | | | | 137/312 |
| 3,175,573 A | * | 3/1965 | Vater | ...................... F16J 15/184 |
| | | | | 251/87 |

(Continued)

FOREIGN PATENT DOCUMENTS

| CN | 202 580 275 U | 12/2012 |
| JP | 53-17933 | 2/1978 |

(Continued)

OTHER PUBLICATIONS

International Search Report dated Feb. 12, 2019 in International (PCT) Application No. PCT/JP2018/041309.

(Continued)

*Primary Examiner* — Kenneth Rinehart
*Assistant Examiner* — Jonathan J Waddy
(74) *Attorney, Agent, or Firm* — Wenderoth, Lind & Ponack, L.L.P.

(57) ABSTRACT

A valve in which a backseat structure is formed at a height to easily prevent penetration of fluid with high accuracy from outside a bonnet to inhibit an increase in internal pressure. In a state in which a packing for sealing (5) is attached inside a bonnet (10) in a longneck structure, a stem (3) is axially inserted and a flow path (13) inside a valve box (2) is provided to be opened and closed by a valve body (4). The bonnet is divided into an upper bonnet (11) and a lower bonnet (12) at a position higher than a position at which a fluid flowing inside the valve box ascends in a liquid state. A backseat mechanism (42) has a fixed-side seal surface (21) formed on a lower end side of the upper bonnet and a movable-side seal surface (41) on an outer peripheral surface of the stem.

9 Claims, 8 Drawing Sheets

(51) Int. Cl.
*F16K 27/12* (2006.01)
*F16K 41/08* (2006.01)

(58) Field of Classification Search
USPC .......................................... 251/211, 214, 330
See application file for complete search history.

(56) References Cited

U.S. PATENT DOCUMENTS

| | | | | |
|---|---|---|---|---|
| 3,257,095 A | * | 6/1966 | Siver | F16K 27/08 251/214 |
| 3,295,856 A | * | 1/1967 | Bredtschneider | F16K 41/02 277/526 |
| 3,758,072 A | * | 9/1973 | Herd | E21B 23/12 251/332 |
| 4,294,427 A | | 10/1981 | Cilny | |
| 4,540,013 A | * | 9/1985 | Furley | F16K 41/14 137/75 |
| 4,917,355 A | * | 4/1990 | Dark | F16K 1/08 251/214 |
| 5,454,547 A | * | 10/1995 | Brown | F16J 15/18 251/214 |
| 5,743,288 A | * | 4/1998 | Mosman | F16K 41/02 137/315.28 |
| 5,908,046 A | * | 6/1999 | Mosman | F16K 43/008 137/312 |
| 2009/0302253 A1 | | 12/2009 | Ko | |

FOREIGN PATENT DOCUMENTS

| | | |
|---|---|---|
| JP | 3-34527 | 7/1991 |
| JP | 2009-293794 | 12/2009 |

OTHER PUBLICATIONS

Extended European Search Report dated Jul. 27, 2021 in corresponding European Patent Application No. 18 87 5339.

* cited by examiner

A Part

VALVE

TECHNICAL FIELD

The present invention relates to valves which open and close a flow path inside a valve box by causing a valve body to ascend and descend and, in particular, a valve in a long neck structure handling an ultralow-temperature fluid such as LNG (liquefied natural gas).

BACKGROUND ART

Normally, a valve for an ultralow-temperature fluid such as LNG is provided to have a longneck structure with a lid-extended bonnet, which is so-called an extension bonnet, in order to prevent freezing of a gland part. Examples of this valve for ultralow temperatures include a gate valve, a globe valve, a needle valve, and a plug valve. In any of these valves, the valve body is caused to ascend and descend by the stem to open and close the flow path.

In a valve for ultralow temperatures of this type, a backseat mechanism is provided in which, when the valve body is caused to ascend to open the flow path, its ascending side abuts and seals a sealed surface provided on a bonnet side to prevent gland leakage. If a liquid as a fluid penetrates above this backseat mechanism, the liquid evaporates due to an increase in temperature and tends to be gasified. Here, there is a possibility that, for example, LNG expands approximately 600 times due to gasification to cause a damage on a packing and a jet of gas on a secondary side of the backseat mechanism. To avoid this, in the ISO standards (ISO28921-1), it is desired to take measures to prevent an abnormal pressure increase in a space between the backseat mechanism and a packing attachment portion. As a method therefor, it is desired to provide, for example, a pressure-releasing mechanism capable of releasing pressure on an upper side of the backseat mechanism or provide the backseat mechanism at a height position which makes the liquid difficult to penetrate.

Among these, as an on-off valve provided with a pressure-releasing mechanism, for example, a low-temperature valve of PTL 1 is disclosed. In this low-temperature valve, a bushing for guiding the valve stem is fixed to the inside of the bonnet in a longneck structure, this bushing is provided with an escape valve, and this escape valve causes the pressure by the vaporized and expanded liquefied gas to escape to the inside of the valve body lid.

Also, as a valve provided with the backseat mechanism at a height where the liquid is difficult to enter, for example, a gate valve of PTL 2 is disclosed. In this valve, a bonnet in a longneck structure is integrally formed, and a tapered seating surface is formed directly below a packing attachment part inside this bonnet. On the other hand, a tapered annular seal part is formed on a stem side. And, with the annular seal part abutting and sealing the seating surface in a full-open state, the backseat function is exerted, preventing an escape of the medium fluid.

CITATION LIST

Patent Literatures

PTL 1: Japanese Utility-Model Application Laid-Open No. 53-17933
PTL 2: U.S. Pat. No. 4,294,427

SUMMARY OF INVENTION

Technical Problem

A valve provided with a pressure-releasing mechanism configured as described in the former PTL 1 has a problem of complication of its inner structure in order to satisfy the standards for ultralow-temperature valves. To provide a pressure-releasing mechanism, a backseat mechanism is arranged at a lower part of the bonnet. Here, since the liquid may be at an ultralow temperature of, for example, −196° C., the material configuring a sealed surface of the backseat mechanism may be limited.

On the other hand, as the gate valve of the latter PTL 2, when a backseat mechanism is provided at a high position inside the bonnet in a longneck structure of an integral type, to configure this backseat mechanism in the bonnet, a sealed surface is required to be provided by performing so-called backseat process on a bonnet side. In this case, a cutter (tool) is inserted into a depth side of an inner peripheral surface from outside the bonnet, and the cutter is put on the surface to be processed in a state that is difficult to be viewed from outside. Thus, there is a possibility that the processing accuracy is low. Furthermore, possibilities also arise that the cutter cannot reach the sealed surface or is difficult to be put thereon and thus the sealed surface cannot be processed at an accurate position. Moreover, similarly, processing is also difficult when hard-facing such as stellite filling is performed on the sealed surface.

Still further, when a backseat mechanism is provided directly below the packing attachment part as in PTL 2, these become close to each other. Thus, it is further difficult to process the sealed surface inside the bonnet. When hard-facing is provided on this sealed surface, a problem also arises that its hardening process is difficult.

Also, even if a component having a sealed surface is provided separately from the bonnet and this component is tried to be attached by incorporation, the number of components is increased and also the number of locations of occurrence of leakage is also increased, thereby causing a possibility of back leakage to arise.

In addition to these, when the bonnet in a longneck structure of an integral type is formed by casting, a dedicated casting is required in accordance with the bonnet of a different length, and supports for changing the length of the bonnet and so forth are difficult. As the length of the bonnet is longer, it tends to be bent more at the time of casting processing, thereby also posing a problem in which it is difficult to ensure concentricity as unmachined.

The present invention was developed to solve the conventional problems, and has an object of providing a valve in a longneck structure which opens and closes a flow path by ascent and descent of a valve body and is suitable for an ultralow-temperature fluid, in which a backseat structure is formed at a height for easily preventing penetration of the fluid with high accuracy from outside a bonnet to reliably inhibit an increase in internal pressure.

Solution to Problem

To achieve the above-described object, a first aspect of the invention is directed to a valve in which, in a state in which a packing for sealing is attached inside a bonnet in a longneck structure, a stem is axially inserted so as to freely ascend and descend and a flow path inside a valve box is provided so as to be freely opened and closed by a valve body provided at a lower end of this stem, wherein the bonnet is integrally provided in a state of being divided into an upper bonnet and a lower bonnet at a position higher than a position at which a fluid flowing inside the valve box ascends in a liquid state, and a backseat mechanism has a fixed-side seal surface formed on a lower end side of the upper bonnet and a movable-side seal surface formed on an outer peripheral surface of the stem and forms abutting sealing by the movable-side seal surface and the fixed-side seal surface when the valve body is open.

A second aspect of the invention is directed to the valve, in which, in a state in which an insertion part formed on a lower part of the upper bonnet fits in a diameter-enlarged recessed groove formed on an inner periphery of an upper part of the lower bonnet, these upper bonnet and lower bonnet are welded, and a space is provided between a lower end face of the insertion part and a bottom surface of the diameter-enlarged recessed groove.

A third aspect of the invention is directed to the valve, in which the movable-side seal surface is integrally formed on the stem, and the fixed-side seal surface is integrally formed at a lower end of the upper bonnet.

A fourth aspect of the invention is directed to the valve, in which the movable-side seal surface is integrally formed on the stem, and the fixed-side seal surface is formed at a lower end of a seal member attached to a lower part of the upper bonnet.

A fifth aspect of the invention is directed to the valve, in which the seal member is provided by a metal material or a resin material, or a combination of both.

A sixth aspect of the invention is directed to the valve, in which the seal member is attached in a narrowly-attached state or a loosely-fitting state between the upper bonnet and the lower bonnet.

A seventh aspect of the invention is directed to a valve in which, in a state in which a packing for sealing is attached inside a bonnet in a longneck structure, a stem is axially inserted so as to freely ascend and descend and a flow path inside a valve box is provided so as to be freely opened and closed by a valve body provided at a lower end of this stem, wherein the bonnet is integrally provided so as to be in a state of being divided into an upper bonnet and a lower bonnet at a position higher than a position at which a fluid flowing inside the valve box ascends in a liquid state, and a backseat mechanism has a fixed-side seal surface formed on the upper bonnet side and a movable-side seal surface formed on an outer peripheral surface of the stem and forms abutting sealing by the movable-side seal surface and the fixed-side seal surface when the valve body is open.

An eighth aspect of the invention is directed to the valve, in which an angle of the movable-side seal surface and the fixed-side seal surface with respect to an axial direction is 30° to 45°.

Advantageous Effects of Invention

From the first aspect of the invention, the valve opens and closes the flow path by ascent and descent of the valve body, is suitable for an ultralow-temperature fluid, and has a longneck structure. With the bonnet provided in a divided structure, without inserting a tool such as a cutter on the inner peripheral side of the bonnet, the fixed-side seal surface can be easily processed with high accuracy at a predetermined height by accurately putting the tool such as a cutter as directly viewing the lower end face side of the upper bonnet from outside. Also, the upper bonnet can be fabricated by processing, for example, a tubular member, and the length can be easily adjusted. Thus, with the bonnet divided structure, the longneck structure with a suitable length can be easily acquired. In this case, the position at which the upper bonnet and the lower bonnet is set at a position higher than the position at which the fluid flowing inside the valve box ascends in a liquid state, that is, a position equal to or higher than a critical temperature of the ultralow-temperature fluid. Thus, even if the liquid of the ultralow-temperature fluid enters inside the bonnet in an open state of the valve body, the liquid is in a gaseous state at the division position. That is, the ultralow-temperature fluid does not ascend as in a liquid state to a position higher than the backseat provided at the division position. Thus, this fluid can be reliably prevented from expanding by gasification in a state in which the liquid ultralow-temperature fluid is enclosed on a side upper than the seal position by the backseat mechanism. This can inhibit an increase in internal pressure and can prevent damage on the packing on the secondary side of the backseat mechanism and gas leakage. In this case, by setting the position of the backseat mechanism higher, the temperature limit is decreased compared with a liquid-contact part. For example, the fixed-side seal surface can be configured of a material that can resist a temperature on the order of −30° C., and any of various materials can be used.

Moreover, with the movable-side seal surface and the fixed-side seal surface abutting on and sealed each other when the valve body is fully open, when the stem is operated to a restriction position in the full-open state, the movable-side seal surface automatically abuts on and is sealed on the fixed-side seal surface, reliably preventing penetration of the fluid in a liquid state to a packing side.

With a component for releasing pressure such as a pressure-releasing mechanism not incorporated, an increase in the number of components is suppressed, easy assembling can be achieved, complication of the inner structure is suppressed, and an occurrence of back leakage is also prevented. The material configuring the fixed-side seal surface is not limited, and the fixed-side seal surface can be formed directly on the metal-made upper bonnet.

With division into the upper bonnet and the lower bonnet, molding by casing is easy. By changing the length of the upper bonnet, the length of the whole bonnet can be easily changed. Also, concentricity as unmachined is easily ensured.

From the second aspect of the invention, in a state in which the insertion part of the upper bonnet fits in the diameter-enlarged recessed groove of the lower bonnet, the upper bonnet and the lower bonnet can be fixedly attached more easily by welding and fixed in a positioned state. With a space provided between the lower end face of the insertion part and the bottom surface of the diameter-enlarged recessed groove, a separate seal member can be attached in this space.

From the third aspect of the invention, the movable-side seal surface can be integrally formed on the stem, and the fixed-side seal surface can be integrally formed on the upper bonne. Thus, as the number of components is suppressed, a high backseat function is exerted by a seal between the movable-side seal surface and the fixed-side seal surface.

From the fourth aspect of the invention, the seal member can be formed separately from the upper bonnet. Thus, in accordance with the performance required for the backseat mechanism, the seal member can be formed by selecting a metal material or a resin material, thereby allowing a predetermined seal performance to be exerted. Since the seal member can be formed in a compact annular shape, the fixed-side seal surface can also be easily processed.

From the fifth aspect of the invention, with a seal structure of a metal touch or soft seal, or a combination of both of these, a backseat mechanism of any of various types suitable for the characteristics of the low-temperature fluid flowing inside is provided, and leakage at the time of valve opening can be reliably prevented.

From the sixth aspect of the invention, when the seal member is attached in a narrowly-attached state, the seal member is arranged at a predetermined position to prevent a position shift at the time of sealing between the fixed-side seal surface of this seal member and the movable-side seal surface of the stem and exert high sealability. On the other hand, when the seal member is attached in a loosely-fitting state, even if the upper bonnet is jointed in a state of being tilted with respect to the lower bonnet, the seal member can be attached in a state in which this tilt is allowable. With the fixed-side seal surface of the seal member and the movable-side seal surface of the stem, a backseat function with a more uniform surface pressure is exerted.

From the seventh aspect of the invention, the valve opens and closes the flow path by ascent and descent of the valve body, is suitable for an ultralow-temperature fluid, and has a longneck structure. With the bonnet provided in a divided structure and the fixed-side seal surface provided on an upper bonnet side (bonnet inner peripheral side), processing by a tool such as a cutter from a division position can be made. Despite the longneck structure suitable for the ultralow-temperature fluid, the fixed-side seal surface can be easily processed with high accuracy at a predetermined height. Also, the upper bonnet can be fabricated by processing, for example, a tubular member, and the length can be easily adjusted. Thus, with the bonnet divided structure, the longneck structure with a suitable length can be easily acquired. In this case, the position at which the upper bonnet and the lower bonnet is set at a position higher than the position at which the fluid flowing inside the valve box ascends in a liquid state, that is, a position equal to or higher than a critical temperature of the ultralow-temperature fluid. Thus, even if the liquid of the ultralow-temperature fluid enters inside the bonnet in an open state of the valve body, the liquid is in a gaseous state at the division position. That is, the ultralow-temperature fluid does not ascend as in a liquid state to a position higher than the backseat provided at a position higher than this division position. Thus, this fluid can be reliably prevented from expanding by gasification in a state in which the liquid ultralow-temperature fluid is enclosed on a side upper than the seal position by the backseat mechanism. This can inhibit an increase in internal pressure and can prevent damage on the packing on the secondary side of the backseat mechanism and gas leakage. In this case, by setting the position of the backseat mechanism higher, the temperature limit is decreased compared with a liquid-contact part. For example, the fixed-side seal surface can be configured of a material that can resist a temperature on the order of −30° C., and any of various materials can be used.

Moreover, with the movable-side seal surface and the fixed-side seal surface abutting on and sealed each other when the valve body is fully open, when the stem is operated to a restriction position in the full-open state, the movable-side seal surface automatically abuts on and is sealed on the fixed-side seal surface, reliably preventing penetration of the fluid in a liquid state to a packing side.

With a component for releasing pressure such as a pressure-releasing mechanism not incorporated, an increase in the number of components is suppressed, easy assembling can be achieved, complication of the inner structure is suppressed, and an occurrence of back leakage is also prevented. The material configuring the fixed-side seal surface is not limited, and the fixed-side seal surface can be formed directly on the metal-made upper bonnet.

With division into the upper bonnet and the lower bonnet, molding by casing is easy. By changing the length of the upper bonnet, the length of the whole bonnet can be easily changed. Also, concentricity as unmachined is easily ensured. In particular, for example, in the case of a gate valve having a large diameter, the valve body is required to ascend greatly in opening operation, and the backseat mechanism is required to be provided above accordingly. According to the present invention, the fixed-side seal surface can be formed at any position on the upper bonnet in the bonnet divided structure. Thus, the backseat mechanism can be provided at a suitable position in accordance with the size of the large-diameter valve body.

From the eighth aspect of the invention, a contact area between the movable-side seal surface and the fixed-side seal surface is increased, and sealability by the backseat mechanism can be enhanced.

DESCRIPTION OF EMBODIMENTS

Figure 1:
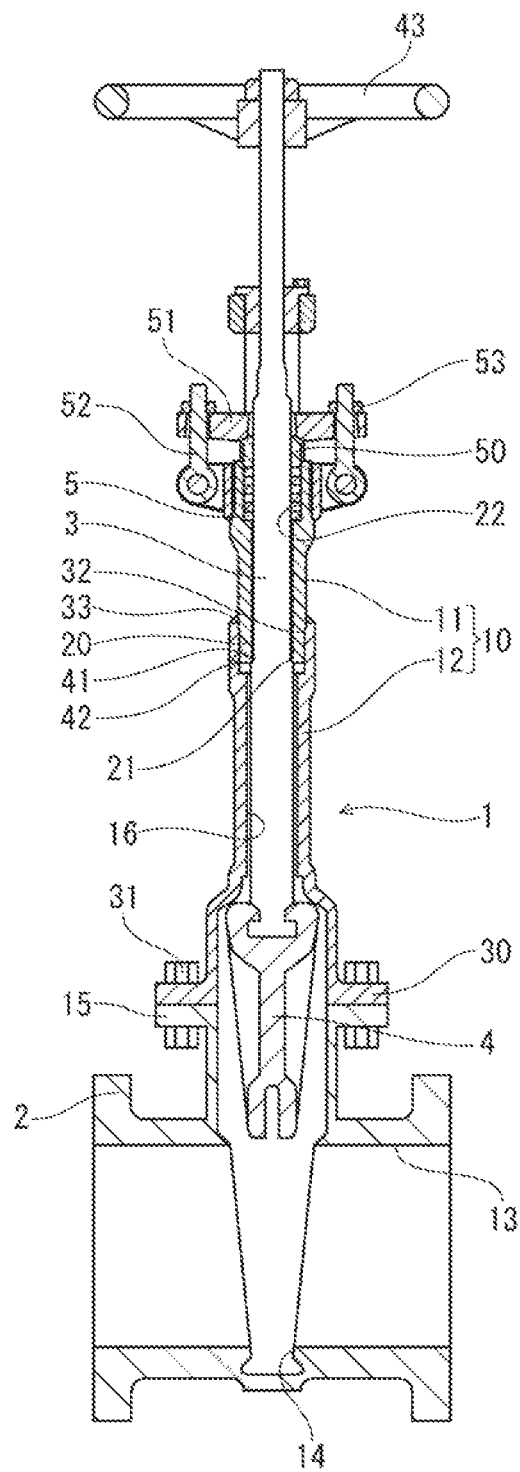
FIG. 1 is a longitudinal sectional view depicting a first embodiment of a valve of the present invention.
Figure 2:
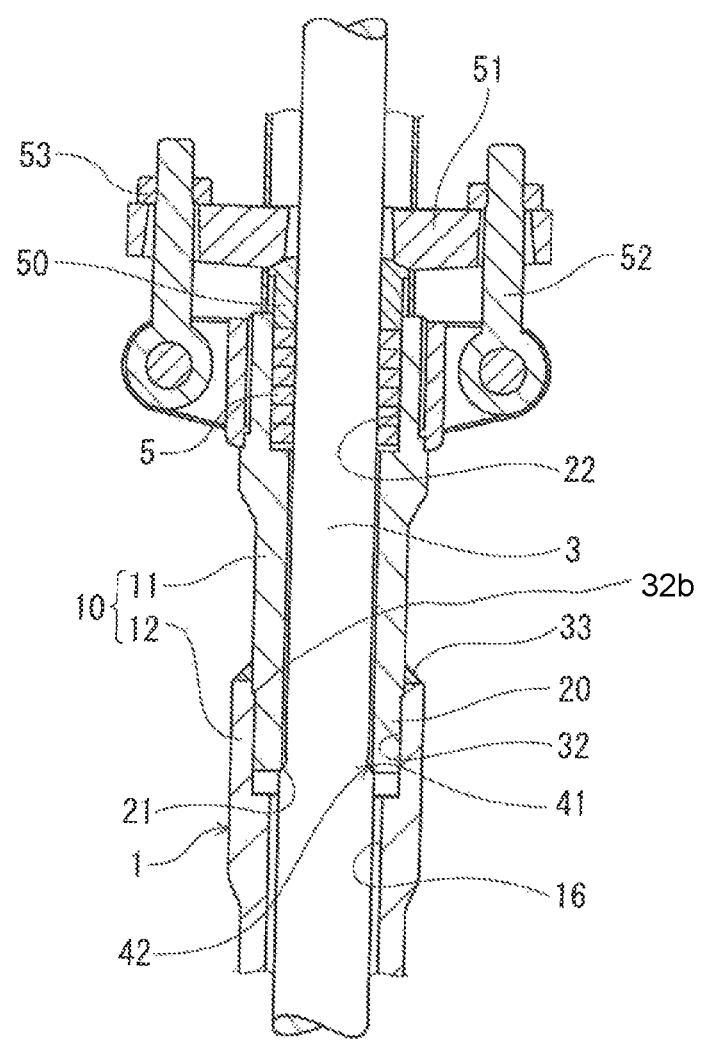
FIG. 2 is an enlarged sectional view of main parts of FIG. 1.

In the following, the valve of the present invention is described in detail based on embodiments. Depicted in FIG. 1 is a first embodiment of the valve, and depicted in FIG. 2 is an enlarged sectional view of main parts of FIG. 1. The valve (hereinafter referred to as a valve main body 1) of the present invention is formed of an on-off valve of a gate valve, and has a valve box 2, a stem 3, a valve body 4, a packing 5, and a bonnet 10. The bonnet 10 is provided to have a longneck structure in an extending shape having an upper bonnet 11 and a lower bonnet 12, which will be described further below. This bonnet 10 prevents freezing of a gland portion against an ultralow-temperature fluid such as LNG, allowing the ultralow-temperature fluid to flow by opening and closing of the valve body 4.

As depicted in FIG. 1, the valve box 2 is formed of a metal material having low-temperature resistance such as, for example, a stainless material. Inside this valve box, a straightly-shaped flow path 13 is provided and a valve seat 14 is formed in a direction of crossing this flow path 13. On an upper part of the valve box 2, a flange part 15 for connection of the bonnet 10 is formed. Via this flange part 15, the bonnet 10 is fixedly attached to the valve box 2.

Inside the bonnet 10, a stem shaft insertion hole 16 is provided. The stem 3 is inserted into this shaft insertion hole 16 so as to freely ascend and descend. To a lower end of the stem 3, the valve body 4 is attached. When the stem 3 is operated to ascend or descend, the valve body 4 makes contact with or goes away from the valve seat 14, thereby providing the flow path 13 to be freely opened and closed.

In FIG. 2, the bonnet 10 is provided by, as with the valve box 2, a metal material having low-temperature resistance such as a stainless material, and is divided into the upper bonnet 11 and the lower bonnet 12 at a predetermined position. With these integrally fixed, the whole is configured.

In this case, a division between the upper bonnet 11 and the lower bonnet 12 is at a position higher than a height position at which, when the fluid flowing inside the valve box 2, for example, an ultralow-temperature fluid such as an LNG, flows in a liquid state and this fluid enters the inside of the bonnet 10 and ascends as keeping the liquid state, this liquid may reach the highest. The height position at which this liquid may reach highest is a height position at which the fluid flowing through the flow path reaches its boiling point. For example, when the fluid is LNG, the average boiling point is −162° C., although varying depending on the composition of the fluid, and a height position at which the temperature becomes higher than that boiling point corresponds to the above described height position. In the case of an on-off valve of the present embodiment, a fluid temperature at a division position between the upper bonnet 11 and the lower bonnet 12 was equal to or higher than −20° C.

The upper bonnet 11 is formed in a substantially cylindrical shape. On its lower side, a diameter-reduced insertion part 20 capable of being inserted into the lower bonnet 12 is provided. The insertion part 20 has a length set as appropriate and, in the present example, is provided to have a length on the order of 50 mm, and thereby the insertion depth is also 50 mm. The insertion depth is preferably set so that the upper bonnet 11 is not tilted when the upper bonnet 11 is inserted into the lower bonnet 12 and their concentricity can be ensured.

Figure 3:
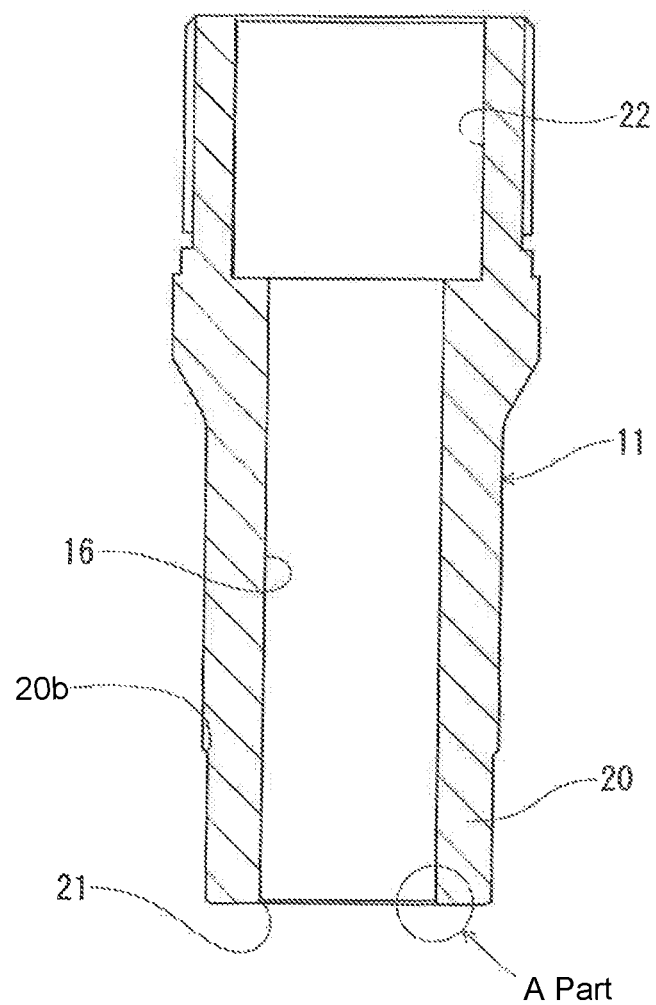
FIG. 3(a) is a longitudinal sectional view depicting an upper bonnet.
FIG. 3(b) is an enlarged view of an A portion of FIG. 3(a).
Figure 3:
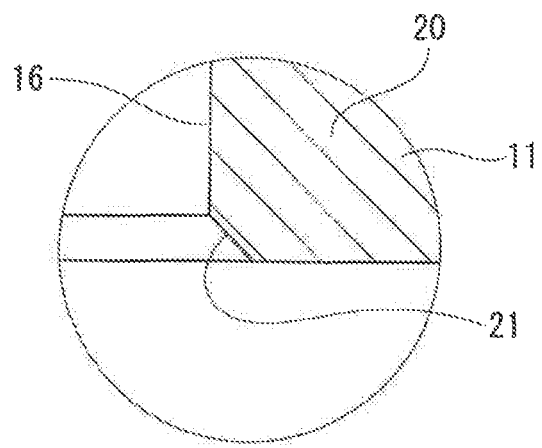

As depicted in FIG. 3(a) and FIG. 3(b), a lower side of the upper bonnet 11, that is, an inner periphery at a lower end of the insertion part 20 of the upper bonnet 11 in the present embodiment, is subjected to C chamfering. With this C chamfering, a tapered metal-made fixed-side seal surface 21 is integrally formed with the upper bonnet 11. A diameter-reduced step portion 20b is formed on the upper side of the outer circumference of the insertion part 20. In the valve main body 1 of the present embodiment, the fixed-side seal surface 21 is formed on a lower end side of the upper bonnet 11. Here, the lower end side of the upper bonnet 11 represents an area on a lower side of the upper bonnet 11 including a lower end face of the upper bonnet 11.

On an upper inner peripheral side of the upper bonnet 11, an attachment part 22 is provided with its diameter enlarged to be slightly larger than the stem shaft insertion hole 16. To this attachment part 22, the packing 5 for sealing of the stem 3 is attached.

On the other hand, the lower bonnet 12 depicted in FIG. 1 and FIG. 2 is formed of, for example, a casing, and is arranged on a lower part of the upper bonnet 11. On its lower side, a flange part 30 is formed. Via this flange part 30, the lower bonnet is fixedly attached to the flange part 15 of the valve box 2 by bolting with a bolt 31. On an upper inner peripheral side of the lower bonnet 12, a diameter-enlarged recessed groove 32 allowing the insertion part 20 to be inserted in a fitting state is formed so as to have a dimension slightly longer than the insertion part 20. A step portion 32b is formed on the upper side of the inner circumference of the diameter-enlarged recessed groove 21.

The above-described upper bonnet 11 and lower bonnet 12 are integrally provided by fixed attachment of a welded part 33 in a state in which the insertion part 20 fits in the diameter-enlarged recessed groove 32. The diameter-reduced step portion 20b is engaged with the step portion 32b at the attaching of the upper bonnet 11 to the lower bonnet 12. Here, a space S is provided between a lower end face 20a of the insertion part 20 and a bottom surface 32a of the diameter-enlarged recessed groove 32. The welded part 33 is provided at a position with an appropriate distance kept from the fixed-side seal surface 21 so that the fixed-side seal surface 21 is not thermally deformed. In the present example, with the depth of the insertion part 20 of the upper bonnet 11 provided to be a depth on the order of 50 mm, the welded part 33 and the fixed-side seal surface 21 are separated from each other with a distance therebetween on the order of 50 mm, thereby allowing thermal deformation to be sufficiently avoided. This distance is preferably equal to or longer than 30 mm and, more preferably, equal to or longer than 50 mm.

Also, in the present example, a lower side of the upper bonnet 11 as the insertion part 20 is inserted into the lower bonnet 12, and a tip on the lower side of this upper bonnet 11 serves as the fixed-side seal surface 21. That is, the fixed-side seal surface 21 of the upper bonnet 11 is shaped with its perimeter wrapped by an upper opening of the lower bonnet 12. When a backseat mechanism 42 functions, a movable-side seal surface 41 provided to the stem 3 abuts on the tapered fixed-side seal surface 21 opening downward. Thus, to the fixed-side seal surface 21, a force to open outward is applied. However, according to the present example, the fixed-side seal surface 21 has its periphery wrapped by the lower bonnet 12, and is thus sufficiently resistant to the force opening outward and can stably exert a function as a backseat. Note that even if the lower bonnet 12 is not necessarily present on the periphery of the fixed-side seal surface 21, with the insertion part of the upper bonnet 11 inserted into the lower bonnet, it is possible to oppose a force in a direction of expanding the diameter of the upper bonnet. Thus, a similar effect can be acquired even when, for example, the fixed-side seal surface 21 is provided above the bonnet division position as in a fifth embodiment, which will be described further below.

Figure 4:
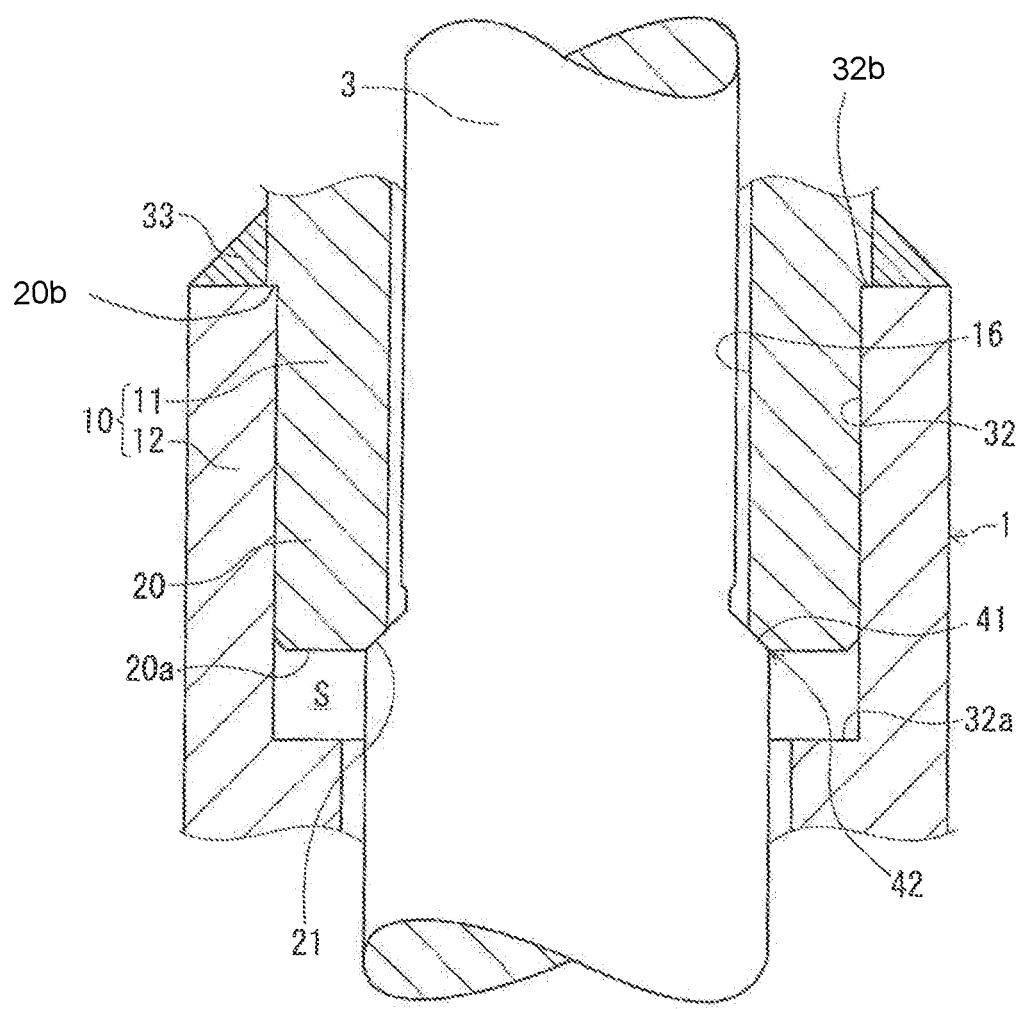
FIG. 4 is a partially enlarged sectional view of FIG. 2.

The stem 3 is provided by a metal material such as, for example, a stainless material. In FIG. 4, the tapered movable-side seal surface 41 that can be sealed onto the above-described fixed-side seal surface 21 is integrally formed on the outer peripheral surface of this stem 3. The movable-side seal surface 41 is formed with high edge quality, and burrs are removed by processing. The stem 3 has a shape with the diameter of an upper part of this tapered movable-side seal surface 41 reduced. At a boundary portion with respect to this diameter-reduced part, a constricted portion having the most-reduced diameter is provided. With this constricted diameter-reduced part, a margin occurs in a space where a cutter for processing or the like is moved when the tapered movable-side seal surface 41 is processed, the tapered surface can be formed with high edge quality, and the function as a backseat mechanism can be improved.

The movable-side seal surface 41 and the above-described fixed-side seal surface 21 are provided at a position where they abut on and seal each other at the time of opening the valve body 4, serving as the backseat mechanism 42 with the movable-side seal surface 41 and the fixed-side seal surface 21 abutting on and sealing each other.

To the stem 3, an operation handle 43 is attached. With rotation of this handle 43, the stem 3 ascends and descends to make a metal touch at a position as a reference, without a change of the full-open position of the valve body 4 by the operation of this handle 43. This metal-touch reference position is set so as not to be influenced by an increase or decrease in dimension of each component due to a temperature change.

The movable-side seal surface 41 and the fixed-side seal surface 21 may be coated, although not depicted, with an appropriate coating agent in order to prevent galling and flows which may occur when these surfaces make contact with each other. Also, the movable-side seal surface 41 and the fixed-side seal surface 21 may be subjected to surface hardening or the like such as stellite filling. In the present example, since the backseat mechanism 42 is provided considerably above the valve body 4 in contact with the ultralow-temperature fluid, the temperature is considerably high at this position. Thus, compared with the conventional structure in which the backseat mechanism is provided near the valve body 4, galling due to sliding between the fixed-side seal surface 21 and the movable-side seal surface 41 tends not to occur. Even without coating with a coating agent or performing surface hardening or the like, it may be possible to sufficiently function as the backseat mechanism 42.

In FIG. 2, the packing 5 is formed in a cylindrical shape, with a reinforcing-material-impregnated expanded graphite taken as a material and, in the attachment part 22 of the upper bonnet 11, is attached around the stem 3 above the fixed-side seal surface 21 of the backseat mechanism 42.

Above the packing 5, a gland 50 in a substantially cylindrical shape having an outer diameter substantially equal to that of this packing 5 is arranged on the outer periphery of the stem 3. Above this gland 50, a plate-shaped gland retainer 51 is attached in a state in which the stem 3 penetrates through its center. On an outer diameter side of an upper part of the upper bonnet 11, two gland bolts 52, 52 are axially and rotatably attached on a gland retainer 51 side. In a state in which the gland retainer 51 is interposed between these gland bolts 52, gland nuts 53 for fixing are screwed onto the gland bolts 52. With this, a fastening force by the gland bolts 52 and the gland nuts 53 is transmitted via the gland retainer 51 and the gland 50 to the packing 5, causing axial sealing by fastening this packing 5.

Note that while the valve is an on-off valve of a gate valve in the above-described embodiment, it is not limited to the on-off valve, and can be applied to any of valves in various structures which open and close the valve seat 14 by causing the valve body 4 to ascend and descend and have a backseat structure, such as a globe valve, needle valve, and plug valve.

While the upper bonnet 11 and the lower bonnet 12 are integrated by fixed attachment of the welded part 33, these can also be integrally provided by being screwed or by another means.

Also, while the angles of the movable-side seal surface 41 and the fixed-side seal surface 21 of the backseat mechanism 42 are formed by C chamfering at 45° with respect to the axial direction, these angles may be changed if these can mutually abut on and seal each other at the time of full-open. For example, the seal surfaces can be provided on a flat plane. As the angles of the movable-side seal surface 41 and the fixed-side seal surface 21 of the backseat mechanism 42 with respect to the axial direction are smaller, the contact area between both seal surfaces can be increased. Also, by the wedge effect, a higher contact pressure can be easily acquired, and sealability by the backseat mechanism 42 can be enhanced. In consideration of sealability, processability, and so forth, this angle is preferably in a range of 30° to 45° and, when sealability is considered as important, is preferably set at 30°.

Next, the operation of the valve in the above-described embodiment in the present invention is described.

In FIG. 1 to FIG. 4, in the valve main body 1 in the present invention, as described above, the flow path 13 is provided so as to be freely open and closed by the valve body 4 connected to the stem 3 axially inserted so as to be freely ascend and descend inside the bonnet 10 in a longneck structure, and the valve main body has the fixed-side seal surface 21 formed on the upper bonnet 11 of the bonnet 10 divided at the predetermined position and the movable-side seal surface 41 formed on the stem 3, and the movable-side seal surface 41 and the fixed-side seal surface 21 form the backseat mechanism 42 when these valve bodies are open. With this, on the fixed-side seal surface 21 side, without processing from inside by a tool such as a cutter, processing can be performed from the inner peripheral end face side of the upper bonnet 11 as a portion near the processed surface is directly viewed from outside, and the backseat mechanism 42 can be provided at a high position inside the bonnet 10.

In this manner, since the fixed-side seal surface 21 is easily formed with high accuracy, the backseat mechanism 42 conforms to the ISO standards (ISO28921-1) and can be arranged at a height position at which the fluid is difficult to penetrate in a liquid state.

With this, without filling on the fixed-side seal surface 21, sufficient sealability can be ensured at the time of opening. Thus, the structure of the backseat mechanism 42 can be simplified to decrease the number of components and also reduce the number of steps at the time of processing. On the other hand, filling can be made on the fixed-side seal surface 21. In this case, as with processing of the fixed-side seal surface 21, it is possible to easily conduct work from outside.

By this backseat mechanism 42, it is possible to inhibit fluid leakage from the flow path 13 to the gland 50 side at the time of full-open and prevent damage on the packing 5 attached to the secondary side and external leakage of the gasified fluid. In this case, with division into the upper bonnet 11 and the lower bonnet 12 being made at a position higher than the position at which the liquefied fluid flowing inside the valve box 2 ascend, the liquefied fluid is prevented from reaching the backseat mechanism 42 provided at the division position of the bonnet 10.

Moreover, if the movable-side seal surface 41 and the fixed-side seal surface 21 are formed so as to abut on and seal each other when the valve body 4 is fully open, the movable-side seal surface 41 and the fixed-side seal surface 21 are automatically caused to abut on and seal each other to form the backseat mechanism 42 at the same time when the stem 3 is operated to be in a full-open state to cause full-open, and this can inhibit penetration of the fluid.

In this case, at the time of full-open, replacement of the packing 5, additional tightening of the gland 50, and maintenance of the inside of a shaft insertion part can be performed. At the time of replacement of the packing 5, the gland nuts 53 are loosened and the gland bolts 52 are removed from the gland retainer 51, thereby allowing the gland retainer 51 and gland 50 to be removed to attach and detach the packing 5.

Also, if the handle 43 is turned back by several rotations in a valve-closing direction from a full-open state of the valve main body 1, it is possible to avoid operation from going out of control with the stem 3 fixedly attached because of being left to stand or the like. Here, with some play provided to the handle 43, a seal state between the movable-side seal surface 41 and the fixed-side seal surface 21 can be kept when this handle 43 is rotated to the valve-closing direction.

With the fixed-side seal surface 21 directly formed on the upper bonnet 11, the number of components can be decreased, and assembling is also facilitated. In this manner, since a separate component for sealing is not incorporated, an occurrence of back leakage is also avoided.

With the bonnet 10 provided in a divided structure, processability is improved. This divided structure allows only the upper bonnet 11 to be replaced. By providing the upper bonnet 11 with its length changed in advance, the entire length of the bonnet 10 is easily changed. With the bonnet 10 provided so as to have an optimal length in accordance with the valve main body 1, light weight is also achieved.

With the space S provided between the lower end face 20a of the insertion part 20 and the bottom surface 32a of the diameter-enlarged recessed groove 32, a separate seal member not depicted can be provided inside this space S, a dimensional error between the upper bonnet 11 and the lower bonnet 12 can be absorbed, or thermal contraction and thermal expansion of these can be absorbed.

Figure 5:
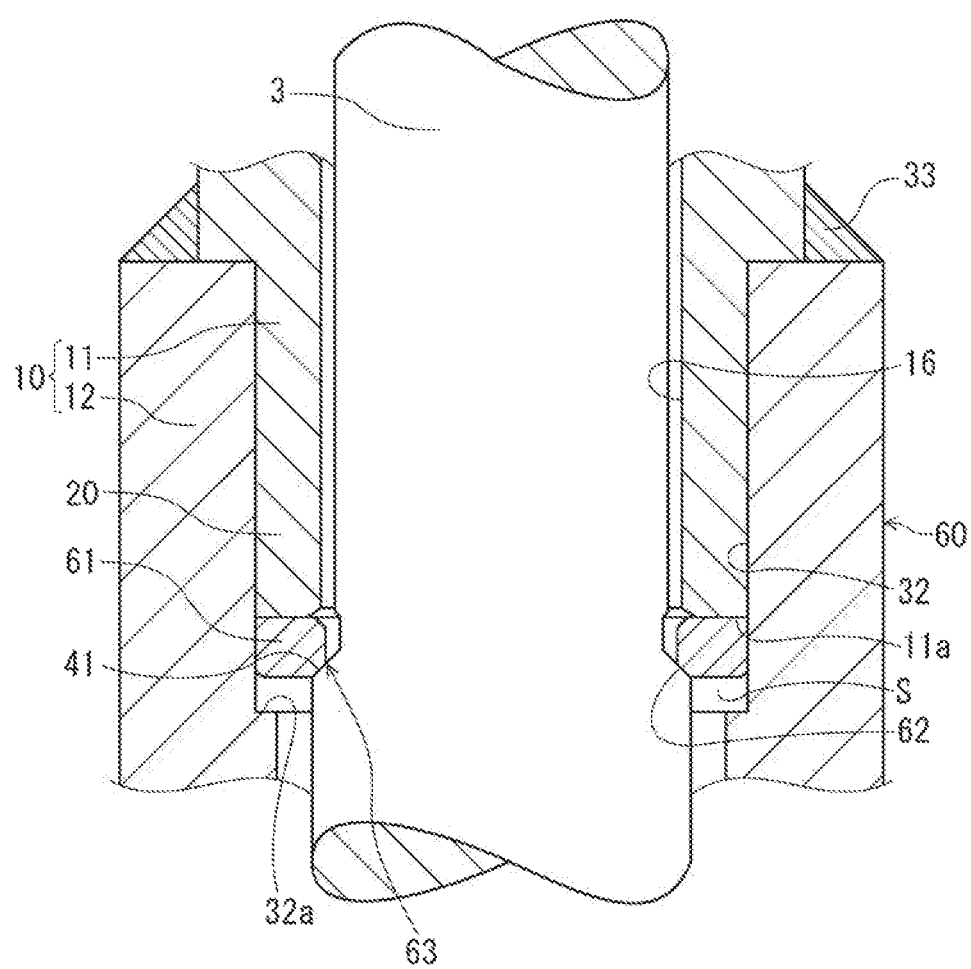
FIG. 5 is a partially enlarged sectional view depicting a second embodiment of the valve of the present invention.

Depicted in FIG. 5 is a second embodiment of the valve of the present invention. Note that in this embodiment onward, the same portion as that of the above-described embodiment is represented by the same reference character and its description is omitted.

In this valve (valve main body 60), the movable-side seal surface 41 is integrally formed on the stem 3. On the other hand, a seal member 61 is provided separately from the upper bonnet 11. The seal member 61 is attached below the upper bonnet 11, and a fixed-side seal surface 62 is formed on an inner peripheral surface side at a lower end of this seal member 61.

The seal member 61 is provided by a metal material or a resin material, or a combination of both of these. For example, it is annularly formed of a metal sheet by a copper alloy, or in a shape with less seat deformation by a soft seat made of PTFE or PCTFE.

The seal member 61 is attached in a narrowly-attached state or a loosely-fitting state between a lower end face 11a of the upper bonnet 11 and the bottom surface 32a of the diameter-enlarged recessed groove 32. In the present embodiment, it is attached in a loosely-fitting state and, when the stem 3 descends, goes away from a lower surface side of the upper bonnet 11 to become a state of descending to a bottom surface position of the diameter-enlarged recessed groove 32. On the other hand, at the time of valve full-open when the stem 3 ascends, the seal member is pushed up with abutment of the movable-side seal surface 41 onto the fixed-side seal surface 21 to ascend to a position of abutting on the lower surface side of the upper bonnet 11, thereby configuring a backseat mechanism 63 formed of the movable-side seal surface 41 and the fixed-side seal surface 62.

With the seal member 61 attached in a loosely-fitting state, the space S is formed between the lower end face 11a and the bottom surface 32a, that is, at the attachment position of the seal member 61. With this space S, even if the upper bonnet 11 in a state of being slightly tilted is welded to the lower bonnet 12, the seal member 61 can be attached as this tilt is allowed. That is, at the time of full-open by ascent of the stem 3, the movable-side seal surface 41 uniformly makes seal contact with the fixed-side seal surface 62, thereby ensuring a backseat function with a uniform surface pressure.

With the seal member 61 provided separately from the upper bonnet 11, this seal member 61 is formed of any of various materials such as a metal material and a resin material different from that of the bonnet 10 in accordance with the properties of the fluid, thereby allowing an improvement in sealability of the backseat mechanism 63. The seal member 61 can also be easily processed, and the seal member 61 can be easily replaced in accordance with a decrease of the backseat function and so forth.

Figure 6:
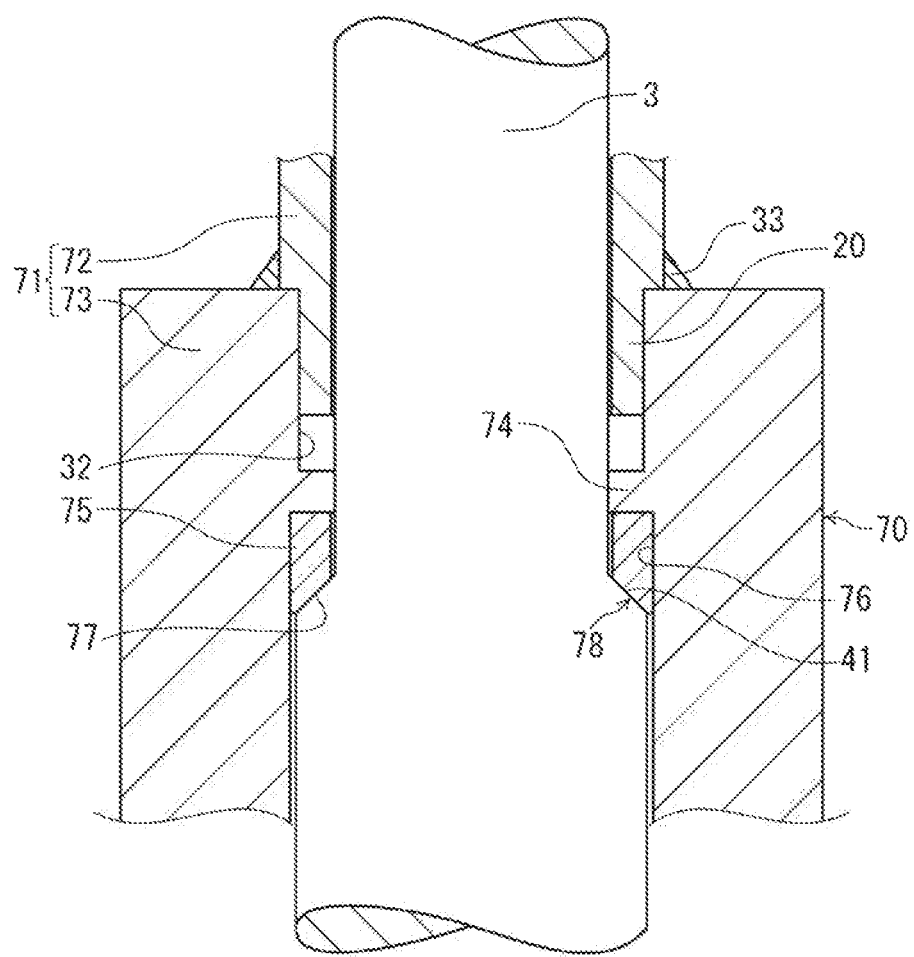
FIG. 6 is a partially enlarged sectional view depicting a third embodiment of the valve of the present invention.

Depicted in FIG. 6 is a third embodiment of the valve of the present invention.

In this valve main body 70, a bonnet 71 has an upper bonnet 72 and a lower bonnet 73. On the inner periphery of the lower bonnet 73, an annular protrusion 74 is formed. On a lower surface side of this annular protrusion 74, a separate seal member 75 formed of a copper ring is attached. In this case, a wedge-shaped attachment recessed part 76 is formed on a lower part of the annular protrusion 74. With the seal member 75 press-fitted and fixed to this attachment recessed part 76, its dropping is prevented.

In this manner, by attaching the seal member 75 in a state with the annular protrusion 74 interposed, as with the above-described case, even if the upper bonnet 72 is welded in a state of being tilted with respect to the lower bonnet 73, the upper bonnet 72 does not make contact with the seal member 75. Thus, the seal member 75 is not tilted due to the influence of the upper bonnet 72. With a metal touch between a fixed-side seal surface 77 formed on the inner peripheral side at the lower end of this seal member 75 and the movable-side seal surface 41 of the stem 3, a sufficient backseat mechanism 78 is configured, and a seal function by this backseat mechanism 78 can be exerted. Note that when the annular protrusion 74 is provided, the seal member 75 may be fixed to the lower bonnet 73 by means other than press-fitting and, for example, it can be fixed by means such as screwing.

Figure 7:
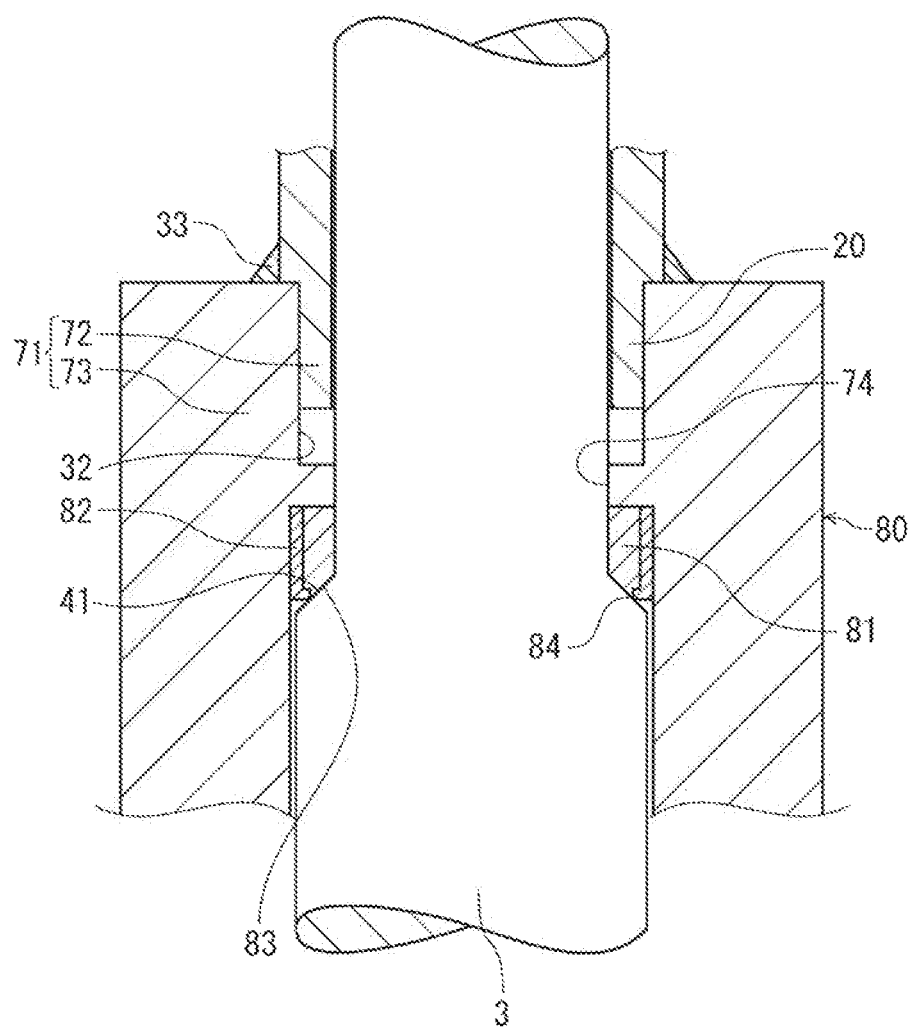
FIG. 7 is a partially enlarged sectional view depicting a fourth embodiment of the valve of the present invention.

Depicted in FIG. 7 is a fourth embodiment of the valve of the present invention.

In this valve main body 80, a separate seal member 81 made of PTFE or PCTFE is provided. On an outer peripheral side of this seal member 81, an annular member 82 for preventing dropping is integrally attached. Together with this annular member 82, attachment is made via the annular protrusion 74 to a lower bonnet 73 side. In this case, sealability with a hybrid function is achieved by a soft seat by a fixed-side seal surface 83 formed on the inner periphery at a lower end of the seal member 81 and a metal touch of an inner-peripheral flange part 83 formed for sealing on the inner periphery at a lower end of the annular member 82, reliably inhibiting fluid leakage.

Figure 8:
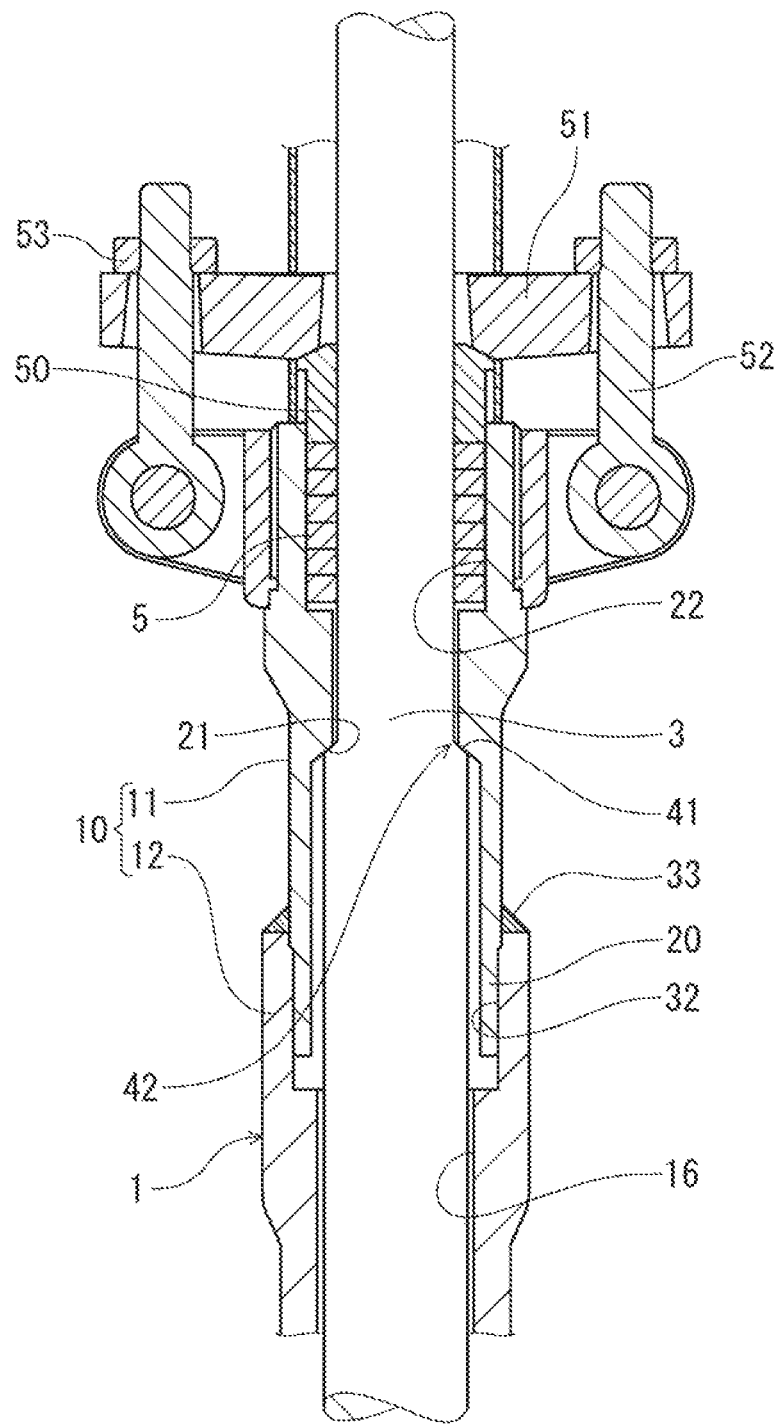
FIG. 8 is a partially enlarged sectional view depicting a fifth embodiment of the valve of the present invention.

Depicted in FIG. 8 is a fifth embodiment of the valve of the present invention.

In this embodiment, the fixed-side seal surface 21 on the upper bonnet 11 side is provided in the middle of the inner periphery of this upper bonnet 11, that is, above the lower end of the upper bonnet 11 and below the attachment part 22, in a tapered shape spreading downward. On the other hand, on the outer peripheral surface of the stem 3, the movable-side seal surface 41 that can be sealed on the fixed-side seal surface 21 is provided. When the valve body 4 is fully open, the fixed-side seal surface 21 and the movable-side seal surface 41 abut on each other, configuring the backseat mechanism 42.

In this case, the ascending position of the stem 3 with respect to the upper bonnet 11 at the time of full-open can be arranged on a higher side to set a large ascending stroke of the stem 3. Thus, for example, even in the case of a valve main body having a large diameter, the backseat mechanism 42 with functions similar to the above can be provided. Furthermore, if the upper bonnet 11 is provided so as to be longer, a larger diameter can be supported.

Since the upper bonnet 11 is in a substantially cylindrical shape, it is possible to easily process the fixed-side seal surface as a tool such as a cutter is inserted from an opening side.

While the embodiments of the present invention have been described in detail in the foregoing, the present invention is not limited to the description of the embodiments described above, and can be variously changed in a range not deviating from the spirit of the invention described in the claims of the present invention.

REFERENCE SIGNS LIST 1 valve body
2 valve box
3 stem
4 valve body
10 bonnet
11 upper bonnet
12 lower bonnet
13 flow path
20 insertion part
20a lower end face
21 fixed-side seal surface
23 packing
32 diameter-enlarged recessed groove
32a bottom surface
33 welded part
41 movable-side seal surface
42 backseat mechanism
61 seal member

The invention claimed is:

1. A low-temperature valve comprising:
a bonnet having a longneck structure;
a valve box connected to the bonnet, a flow path being provided inside the valve box;
a stem axially inserted into the bonnet so as to be freely ascendable and descendable, the stem having a valve body provided at a lower end of the stem; and
a packing attached inside the bonnet for sealing around the stem,
wherein the flow path is configured so as to be freely opened and closed by the valve body,
wherein the bonnet is a divided bonnet comprising an upper bonnet and a lower bonnet integrally fixed to each other, a division position between the upper bonnet and the lower bonnet being set at a predetermined distance from the flow path of the valve box, the predetermined distance being longer than a distance a fluid flowing in the valve box can flow in a liquid state before changing to a gaseous state,
wherein the low-temperature valve includes a backseat mechanism having a fixed-side seal surface formed at a lower end side of the upper bonnet and a movable-side seal surface formed on an outer peripheral surface of the stem, the backseat mechanism forming abutting sealing by the movable-side seal surface and the fixed-side seal surface abutting on and sealing each other when the valve body is in an open position,
wherein the upper bonnet and the lower bonnet are welded together at a welded portion in a state in which an insertion part formed on a lower part of the upper bonnet fits in a diameter-enlarged recessed groove formed on an inner periphery of an upper part of the lower bonnet, and a space is provided between a lower end face of the insertion part and a bottom surface of the diameter-enlarged recessed groove,
wherein a depth to which the insertion part extends into the diameter-enlarged recessed groove is set so that the welded portion is distanced from the fixed-side seal surface of the upper bonnet such that the fixed-side seal surface is not thermally deformed by formation of the welded portion, and
wherein a diameter-reduced step portion is formed on an upper side of an outer circumference of the insertion portion, a step portion is formed on an upper side of an inner circumference of the diameter-enlarged recessed groove, and the upper bonnet and the lower bonnet are welded together with the diameter-reduced step portion being engaged with the step portion.

2. The low-temperature valve according to claim 1, wherein the movable-side seal surface is integrally formed on the stem, and the fixed-side seal surface is integrally formed on a lower end of the upper bonnet.

3. The low-temperature valve according to claim 1, wherein the movable-side seal surface is integrally formed on the stem, and the fixed-side seal surface is formed at a lower end of a seal member attached to a lower end of the upper bonnet.

4. The low-temperature valve according to claim 3, wherein the seal member is provided by a metal material or a resin material, or a combination of both.

5. The low-temperature valve according to claim 4, wherein the seal member is attached in a narrowly-attached state or a loosely-fitting state between the upper bonnet and the lower bonnet.

6. The low-temperature valve according to claim 3, wherein the seal member is attached in a narrowly-attached state or a loosely-fitting state between the upper bonnet and the lower bonnet.

7. The low-temperature valve according to claim 1, wherein an angle of the movable-side seal surface and the fixed-side seal surface with respect to an axial direction is 30° to 45°.

8. A low-temperature valve comprising:
a bonnet having a longneck structure;
a valve box connected to the bonnet, a flow path being provided inside the valve box;
a stem axially inserted into the bonnet so as to be freely ascendable and descendable, the stem having a valve body provided at a lower end of the stem; and
a packing attached inside the bonnet for sealing around the stem,
wherein the flow path is configured so as to be freely opened and closed by the valve body,
wherein the bonnet is a divided bonnet comprising an upper bonnet and a lower bonnet integrally fixed to each other, a division position between the upper bonnet and the lower bonnet being set at a predetermined distance from the flow path of the valve box, the predetermined distance being longer than a distance a fluid flowing in the valve box can flow in a liquid state before changing to a gaseous state,
wherein the low-temperature valve includes a backseat mechanism having a fixed-side seal surface formed on the upper bonnet and a movable-side seal surface formed on an outer peripheral surface of the stem, the backseat mechanism forming abutting sealing by the movable-side seal surface and the fixed-side seal surface abutting on and sealing each other when the valve body is in an open position, wherein the upper bonnet and the lower bonnet are welded together at a welded portion in a state in which an insertion part formed on a lower part of the upper bonnet fits in a diameter-enlarged recessed groove formed on an inner periphery of an upper part of the lower bonnet, and a space is provided between a lower end face of the insertion part and a bottom surface of the diameter-enlarged recessed groove, wherein a depth to which the insertion part extends into the diameter-enlarged recessed groove is set so that the welded portion is distanced from the fixed-side seal surface of the upper bonnet such that the fixed-side seal surface is not thermally deformed by formation of the welded portion, and wherein a diameter-reduced step portion is formed on an upper side of an outer circumference of the insertion portion, a step portion is formed on an upper side of an inner circumference of the diameter-enlarged recessed groove, and the upper bonnet and the lower bonnet are welded together with the diameter-reduced step portion being engaged with the step portion.

9. The low-temperature valve according to claim 8, wherein an angle of the movable-side seal surface and the fixed-side seal surface with respect to an axial direction is 30° to 45°.

* * * * *